(12) United States Patent
Thorn (10) Patent No.: US 11,166,163 B2
(45) Date of Patent: Nov. 2, 2021

(54) SECURE RE-USE OF SIM SECURITY PARAMETERS

(71) Applicant: Evolving Systems, Inc., Englewood, CO (US)

(72) Inventor: David Thorn, London (GB)

(73) Assignee: Evolving Systems, Inc., Englewood, CO (US)

(*) Notice: Subject to any disclaimer, the term of this patent is extended or adjusted under 35 U.S.C. 154(b) by 330 days.

(21) Appl. No.: 16/426,960

(22) Filed: May 30, 2019

(65) Prior Publication Data

US 2019/0380027 A1 Dec. 12, 2019

Related U.S. Application Data

(60) Provisional application No. 62/682,490, filed on Jun. 8, 2018.

(51) Int. Cl.
*H04W 12/43* (2021.01)
*H04W 12/04* (2021.01)
*H04W 8/18* (2009.01)
*H04W 12/06* (2021.01)

(52) U.S. Cl.
CPC ........... *H04W 12/43* (2021.01); *H04W 8/183* (2013.01); *H04W 12/04* (2013.01); *H04W 12/06* (2013.01)

(58) Field of Classification Search
CPC ..... H04W 12/43; H04W 12/04; H04W 8/183; H04W 12/06; H04W 12/35; H04W 88/06
See application file for complete search history.

(56) References Cited

U.S. PATENT DOCUMENTS

| 8,649,789 | B2* | 2/2014 | Shi | H04W 4/50 455/432.3 |
| 9,473,927 | B2* | 10/2016 | Stenberg | H04W 4/60 |
| 10,445,402 | B1* | 10/2019 | Wang | G06N 3/0454 |
| 2010/0311418 | A1 | 12/2010 | Shi et al. | |
| 2011/0268022 | A1* | 11/2011 | Xu | H04Q 3/0025 370/328 |
| 2014/0220968 | A1 | 8/2014 | Stenberg et al. | |
| 2015/0072683 | A1 | 3/2015 | Xiang | |
| 2017/0099601 | A1 | 4/2017 | Prabdial et al. | |

OTHER PUBLICATIONS

International Search Report and Written Opinion dated Sep. 20, 2019 in related foreign application No. PCT/2019/034834, 9 pgs.

* cited by examiner

*Primary Examiner* — Abiy Getachew
(74) *Attorney, Agent, or Firm* — Kilpatrick Townsend & Stockton LLP (57) ABSTRACT

Various arrangements for using a SIM card across multiple wireless networks are presented. A DKi value may be stored by the SIM card. The SIM card may calculated a FKi value using the DKi value and a stored BKi value. The SIM card can attach to a guest wireless network. A challenge may be received by the SIM card from the guest wireless network. The SIM card may calculate an answer to the challenge using the FKi value. The answer may be transmitted to the wireless network. In response to the answer being correct, the wireless device having the SIM card installed is successfully authenticated to use the wireless network.

17 Claims, 6 Drawing Sheets

SECURE RE-USE OF SIM SECURITY PARAMETERS

CROSS-REFERENCE TO RELATED APPLICATION

The present application claims the benefit of priority to U.S. Provisional Application No. 62/682,490, filed on Jun. 8, 2018, the entire contents of which are hereby incorporated by reference for all purposes.

BACKGROUND

Subscriber identification (or identity) module (SIM) cards store a security key value, referred to as Ki. This Ki value may not be read from a SIM card or overwritten and is maintained as a secret in order to maintain the security of the SIM card. The Ki value may be used by the SIM to calculate an answer to a challenge provided by a network operator. The Ki value can be used to authenticate an identity of the SIM card, such as to determine if the SIM card is permitted to have access to a particular wireless network, such as a cellular network. Accordingly, security of the Ki value is of high importance: if the Ki value is acquired by an unauthorized party, the Ki value could be used to gain unauthorized access to a wireless network using another party's account.

SUMMARY

Various arrangements for using a SIM card across multiple wireless networks are presented. In some embodiments a method is presented for doing so. The method can include storing, by the SIM card, a DKi value, wherein the SIM card has an immutable BKi value. The method can include calculating, by the SIM card, a FKi value using the DKi value and BKi value. The method can include attaching, by the SIM card, to a guest wireless network, wherein the SIM card is installed within a wireless device. The method can include receiving, by the SIM card, from the guest wireless network, a challenge. The method can include calculating, by the SIM card, an answer to the challenge using the FKi value. The method can include transmitting the answer to the wireless network, wherein in response to the answer being correct, the wireless device having the SIM card installed is successfully authenticated to use the wireless network.

Embodiments of such a method may include one or more of the following features: The method can include calculating, by a SIM card owner system, the DKi value. The method can include providing, by the SIM card owner system, via a home wireless network, the DKi value to the SIM card. The method can include calculating, by the SIM card owner system, an FKi value based on the DKi value and the BKi value. The method can include providing, by the SIM card owner system, the FKi value to the guest wireless network. The challenge received from the guest wireless network can be based on the FKi value provided by the SIM card owner system. The SIM card owner system can calculate the DKi value by subtracting the Bki value from a random number. The method can include manufacturing the SIM card such that the immutable BKi value is permanently stored and the DKi value is editable. The method can include storing, by the SIM card, a DOPc value, wherein the SIM card has an immutable base OPc (BOPc) value. The method can include calculating, by the SIM card, a FOPc value using the DOPc value and BOPc value. The method can include causing, by the SIM card, a network challenge to be transmitted to the guest wireless network. The method can include calculating, by the SIM card, a network answer to the network challenge using the FOPc value. The method can include receiving, by the SIM card, the network answer to the network challenge from the guest wireless network. The method can include determining, by the SIM card, the calculated network answer to the challenge and the received network answer to the network challenge match. The method can include, in response to the match, authenticating the guest wireless network. The method can include calculating, by a SIM card owner system, the FOPc value based on the DOPc value and the BOPc value. The method can include providing, by the SIM card owner system, the FOPc value to the guest wireless network, wherein the guest wireless network uses the FOPc value to determine the answer to the challenge received from the SIM card.

In some embodiments, a system that uses a SIM card across multiple wireless networks. The system can include a SIM card. The SIM card may store an IMSI. The SIM card may store a BKi value that is immutable. The SIM card may store a DKi value that is editable. The SIM card may calculate a FKi value using the DKi value and BKi value. The SIM card may calculate a response to a challenge using the calculated FKI. The SIM card may output the response to the challenge and an IMSI for transmission to a wireless network.

Embodiments of such a system may include one or more of the following features: The system can include home wireless network comprising a SIM card owner system. The system can include a SIM card database that maps a plurality of IMSIs with a plurality of BKi values, wherein the IMSI is mapped to the BKi value. The SIM card owner system may be further configured to: compute the DKi value mapped to the IMSI and BKi value; and compute the FKi value using the DKi value and the BKi value. The SIM card owner system may be further configured to transmit the DKi value to the SIM card via the home wireless network. The SIM card owner system may be further configured to transmit the FKi value to a guest wireless network. The guest wireless network may create the challenge based on the FKi. The SIM card owner system may be configured to calculate the DKi value by subtracting the BKi value from a random number. The SIM card may be further configured to store a BOPc value that is immutable. The SIM card may be further configured to store a DOPc value that is editable. The SIM card may be further configured to calculate a FOPc value using the DOPc value and the BOPc value. The SIM card may be further configured to calculate a network challenge using the FOPc. The SIM card may be further configured to calculate a calculated network answer to the challenge using the FOPc. The SIM card may be further configured to receive a network answer to the network challenge from a guest wireless network. The SIM card may be further configured to authenticate the wireless network based on the received network answer matching the calculated network answer. The SIM card owner system may be further configured to store the DOPc value as mapped to the IMSI. The SIM card owner system may be further configured to provide the FOPc value to the guest wireless network, wherein the guest wireless network uses the FOPc value to determine the answer to the challenge received from the SIM card.

BRIEF DESCRIPTION OF THE DRAWINGS

A further understanding of the nature and advantages of various embodiments may be realized by reference to the following figures.

DETAILED DESCRIPTION

A network operator may store copies of Ki values associated with SIM cards authorized to access the network operator's wireless network. These Ki values may be used to compute answers to challenges that are posed to SIM cards installed in wireless devices attempting to attach to the wireless network. In response to a challenge, a SIM card installed in a wireless device can calculate an answer using its stored Ki value and may transmit a calculated answer to the network operator via the wireless network. If the same answer is calculated by the network operator system and by the SIM card, the Ki value stored by the SIM card has been successfully determined to match the Ki value stored by the network operator. By performing such a challenge-response process, determining if a Ki value stored by a SIM card matches a Ki value stored by the network operator can be performed without the Ki value being transmitted or read externally from the SIM card.

Since a Ki value may be key to authenticating the identity of a SIM card, wireless network operators may not be willing to share the Ki value, even with other operators of other wireless networks. For example, if a user desires to use a mobile device (e.g., smartphone, cellphone, wireless network-enabled computerized device) on a second network (e.g., a wireless network in another country and/or operated by another network provider) rather than a first network on which it is typically used, the user may be forced to acquire a new SIM card intended for use on the second network. A primary reason for the need for a second SIM card is that the first network operator may not trust the second network operator to keep the SIM card's Ki value secret. Therefore, the operator of the first network does not provide the Ki value of the SIM card to the second network, which the second network needs for authenticating the SIM card by generating a challenge and answer.

As detailed herein, rather than sharing a Ki value, a wireless network operator, or, more generally, SIM card "owners," can share a value that would provide similar security levels to Ki but does not compromise the security of the Ki stored by the SIM card. Embodiments described in relation to the figures detail the use of a delta value, referred to as DKi, that may be used in conjunction with a base Ki (BKi) value. By using a DKi value, a single SIM card can be used for authentication across multiple networks without a protected Ki value being shared among network operators. Such an arrangement may be applied to cellular networks, such as GSM and UMTS (3G, 4G, 5G, etc.) radio access technology (RAT) based systems.

While a Ki value is used by a wireless network to authenticate a wireless device in which the SIM card is installed, the wireless device in which the SIM card is installed may additionally or alternatively to authenticate the wireless network. In some forms of wireless networks, such as cellular networks operating using a Universal Mobile Telecommunications Service (UMTS), an additional value may be stored by the SIM card that is used to authenticate the wireless network. This value can be referred to as an OPc value. Just as a Ki value is not transmitted, but is instead used to compute an answer to a challenge from the wireless network; a SIM card may issue a challenge calculated based on an OPc value that is answered by the wireless network. Both the wireless network and the SIM card have the OPc stored and use the OPc to compute the answer. If the answer received by the SIM card from the wireless network matches the locally-calculated answer, the SIM card has successfully determined that the OPc stored by the wireless network matches the OPc stored locally by the SIM card and authenticates the wireless network.

As detailed herein, similar to how a BKi and DKi are used to safely authenticate the SIM card across multiple wireless networks, a BOPc and DOPc can be used to safely authenticate the wireless network without the OPc needing to be shared among wireless network operators.

Figure 1A:
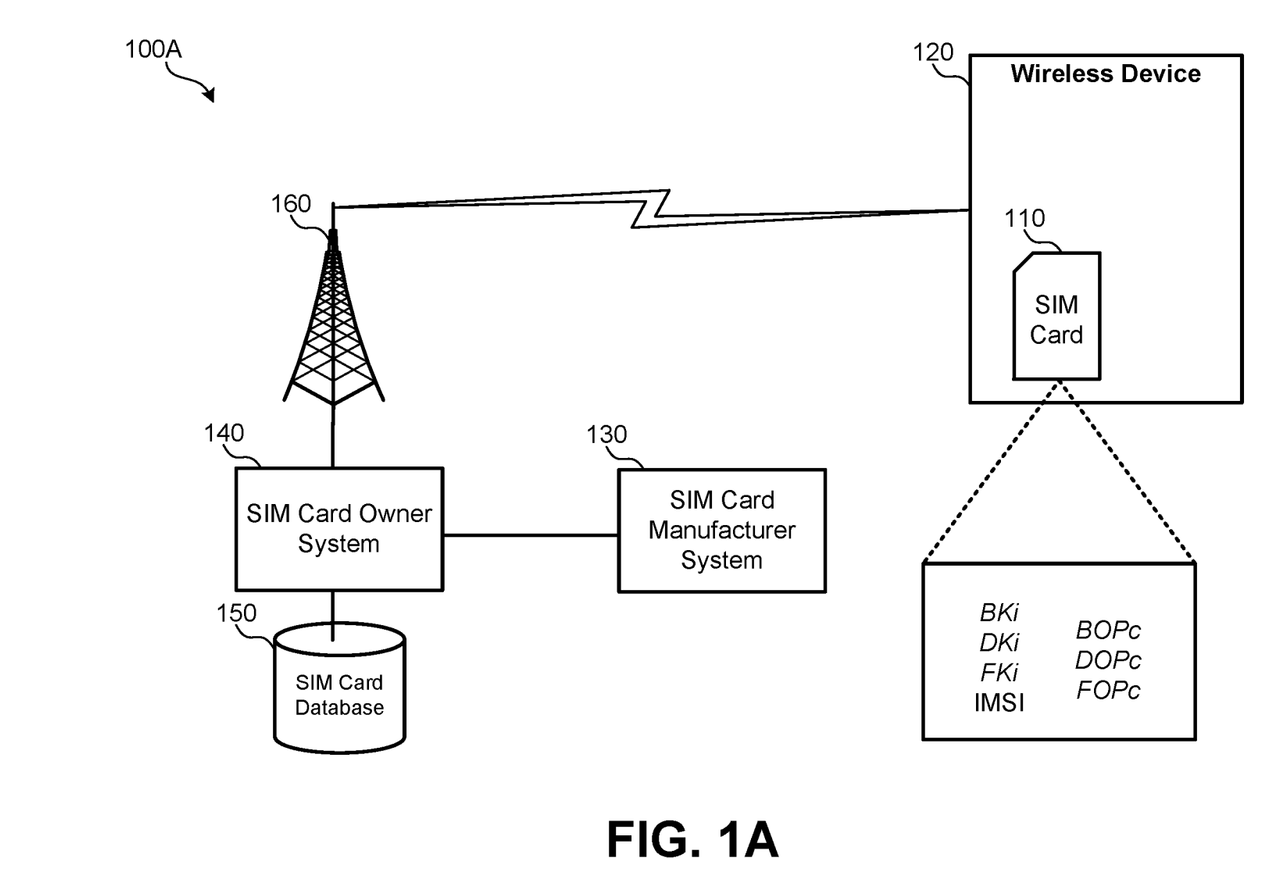
FIG. 1A illustrates an embodiment of a system for using SIM cards.

FIG. 1A illustrates an embodiment of a system 100A for securing authenticating SIM cards and wireless networks. System 100A may include: SIM card 110; wireless device 120; SIM card manufacturer system 130; SIM card owner system 140; SIM card database 150; and wireless network 160. SIM card 110 may be manufactured by SIM card manufacturer system 130. SIM card 110 may have non-transitory memory and have integrated processing capabilities. SIM card manufacturer system 130 may manufacture SIM card 110 on behalf of the SIM card owner that operates SIM card owner system 140. When SIM card 110 is manufactured by SIM card manufacturer system 130, a random value called BKi may be permanently written to SIM card 110. BKi may be written to SIM card 110 such that the BKi value cannot be read or overwritten from SIM card 110. Security may be maintained on the BKi value similarly to a conventional Ki value. SIM card manufacturer system 130 may create SIM card 110 such that a DKi value is stored by SIM card 110. This DKi value may be written and modified by SIM card 110. In some embodiments, the initial value of DKi is set to zero or null. In other embodiments, the initial value of DKi is random or set to a default value.

SIM card owner system 140 may include one or more computer server systems. SIM card owner system 140 may be configured to read and write to one or more non-transitory processor-readable mediums. SIM card database 150 may be stored using one or more non-transitory processor-readable mediums, which can be local or remote from SIM card owner system 140. Specifically, the computer server systems may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). SIM Card manufacturer system 130, in addition to equipment to physically create SIM cards, can use computer systems to initially configure the stored values of SIM cards, including the one or more immutable values stored to the SIM cards.

It should be understood that in some embodiments, the features of SIM card 110 may be manufactured directly as part of wireless device 120. Therefore, data values may be stored by wireless device 120 using similar security, but may not be on a dedicated SIM card. In some embodiments, a SIM card may be used by wireless device 120, but the SIM card may not be removable.

Similarly, when SIM card 110 is manufactured by SIM card manufacturer system 130, a random value called BOPc may be permanently written to SIM card 110. BOPc may be written to SIM card 110 such that the BOPc value cannot be read or overwritten from SIM card 110. Security may be maintained on the BOPc value similarly to a conventional OPc value. The BOPc value may be the same across some or all SIM cards to be used on a particular wireless network. SIM card manufacturer system 130 may create SIM card 110 such that a DOPc value is stored by SIM card 110. This DOPc value may be written and modified by SIM card 110. In some embodiments, the initial value of DOPc is set to zero or null. In other embodiments, the initial value of DOPc is random or set to a default value.

SIM card manufacturer system 130 may also create SIM card 110 such that a full Ki (FKi) value may be stored. The FKi value may be a value computed by the SIM card using DKi and BKi. In some embodiments, FKi is the sum of BKi and DKi. In other embodiments, a different mathematical relationship is established such that BKi and DKi can be used to compute FKi by SIM card 110. The mathematical relationship may be provided from SIM card manufacturer to SIM card owner system 140 or otherwise known by SIM card owner system 140. A full OPc (FOPc) value may be stored and calculated similarly to the FKi.

SIM card manufacturer system 130 may provide the BKi value and/or BOPc of SIM card 110 to SIM card owners system 140. This transfer may represent the only time that the BKi and/or BOPc values of SIM card 110 are transmitted. SIM card owner system 140 may store the BKi value to SIM card database 150. The only places where the BKi value may be stored is in SIM card database 150, which may only be accessible by SIM card owner system 140, and in SIM card 110. The BOPc value may be stored in the same location or a different location by the SIM card owner system 140. Since the BOPc value may be the same across some or all SIM cards manufactured on behalf of SIM card owner system 140, only a single BOPc may be stored by SIM card owner system 140. Each BKi value in SIM card database 150 may be mapped to an international mobile subscriber identity (IMSI). An IMSI may be a unique number, which may be fifteen digits in length, and is typically associated with Global System for Mobile Communications (GSM) and Universal Mobile Telecommunications System (UMTS) network mobile phone systems.

SIM card owner system 140 may be operated by a SIM card owner. The SIM card owner may be in entity on whose behalf SIM card manufacturer system 130 manufactured the SIM card. In some situations, the SIM card owner may be a wireless network operator, such as a wireless network operator that operates wireless network 160. The wireless network can be a cellular network, such as a cellular network that operates according to a GSM or UMTS RAT. In other situations, the SIM card owner may be a separate entity that provides access to another entity's wireless network. For example, the SIM card owner may have acquired the rights to access another entity's wireless network and may have rights to provide SIM cards to use an amount of access. For instance, a SIM card owner may have the right to issue blocks of prepaid time on another entity's cellular network. Accordingly, a SIM card owner may, but not necessarily, operate a wireless network to which wireless device 120, in which SIM card 110 can be installed, may connect.

Wireless device 120 may represent a smartphone, cellular phone, or some other computerized electronic device that may be able to connect with a wireless network and perform authentication using a SIM card. For example, some forms of tablet computers, gaming devices, laptop computers, or other mobile computing devices may be able to communicate with a wireless network and perform authentication using a SIM card. Wireless device 120 does not necessarily need to be a mobile device; for example, gas or electric meters may be able to communicate wirelessly, but may remain in a fixed location. Other possible wireless devices can include smart home devices, such as smart home thermostats, carbon monoxide detectors, smart doorbells, etc. Various Internet-of-Things (IoT) devices are also possible.

In some embodiments, SIM card 110, as manufactured by SIM card manufacturer system 130, may be able to store multiple profiles. Each profile may correspond to a different IMSI and a different DKi (and, thus, a different FKi). However, the same BKi may be used to calculate the FKi across the multiple profiles. By having multiple profiles presence on SIM card 110, it may be possible to have SIM card 110 remain provisioned on multiple wireless networks. For example, if SIM card 110 is to be transitioned between multiple wireless networks on a fairly frequent basis, it may be more efficient to keep SIM card 110 provisioned on the multiple wireless networks and select a particular profile that is associated with the wireless network with which SIM card 110 is to communicate. In such arrangements, SIM card 110 may store two or more profiles. Other embodiments can include three, four, five, six, seven, eight, nine, ten, or more profiles.

Wireless device 120 in which SIM card 110 is installed or a user interacting with wireless device 120 may determine which profile stored by SIM card 110 should be active at a given time. For instance, a user may use a menu system or physical switch on the mobile device to indicate a particular profile that is to be currently activated. While a particular profile is currently activated, other profiles may be disabled. In other embodiments, an algorithm may be executed by the mobile device or SIM card to determine a particular profile that is to be activated. For example, a particular profile may be activated based on geographic location or based on which wireless networks with which communication is currently possible.

Figure 1B:
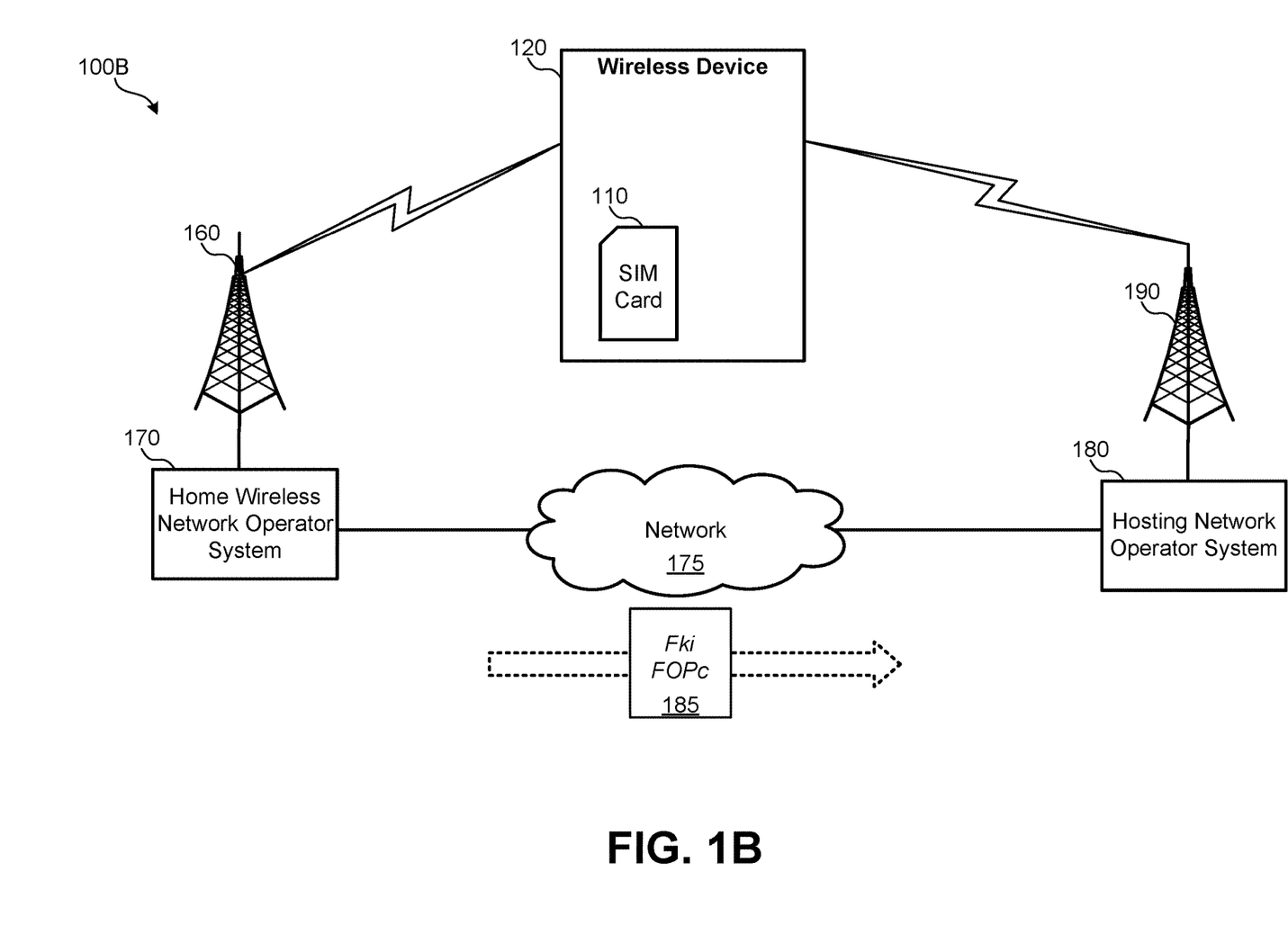
FIG. 1B illustrates an example of a system that includes a mobile device switching from operating on a first wireless network to a second wireless network.

FIG. 1B illustrates an example of a system 100B that includes a mobile device switching from operating on a first wireless network to a second wireless network. In system 100B, wireless device 120, having installed SIM card 110. may initially be registered on a "home" wireless network, such as wireless network 160. Wireless network 160 may include or be in communication with home wireless network operator system 170, which may include a SIM card database that stores the BKi and BOPc of SIM card 110.

Wireless device 120 may attempt to communicate with a different wireless network, such as wireless network 190, which can be understood as the "guest" wireless network. Wireless network 190 may include or be in communication with HNO system 180. In response to wireless device 120 attempting to connect with wireless network 190, Hosting Network Operator (HNO) system 180 may determine home wireless network operator system is associated with SIM card 110 (e.g., based on the IMSI received by HNO system 180 from wireless device 120). HNO system 180 may contact home wireless network operator system 170 via network 175, which can be the Internet, a private communication network, or some combination thereof. In response to the request, home wireless network operator system 170 may look-up and transmit data 185, which can include the FKi and/or FOPc for SIM card 110, to HNO system 180. The FKi may then be used to authenticate SIM card 110 by HNO system 180 and/or the FOPc may be used to authenticate wireless network 190 by SIM card 110. In this arrangement, the Bki and the BOPc is never exposed to HNO system 180.

Figure 2:
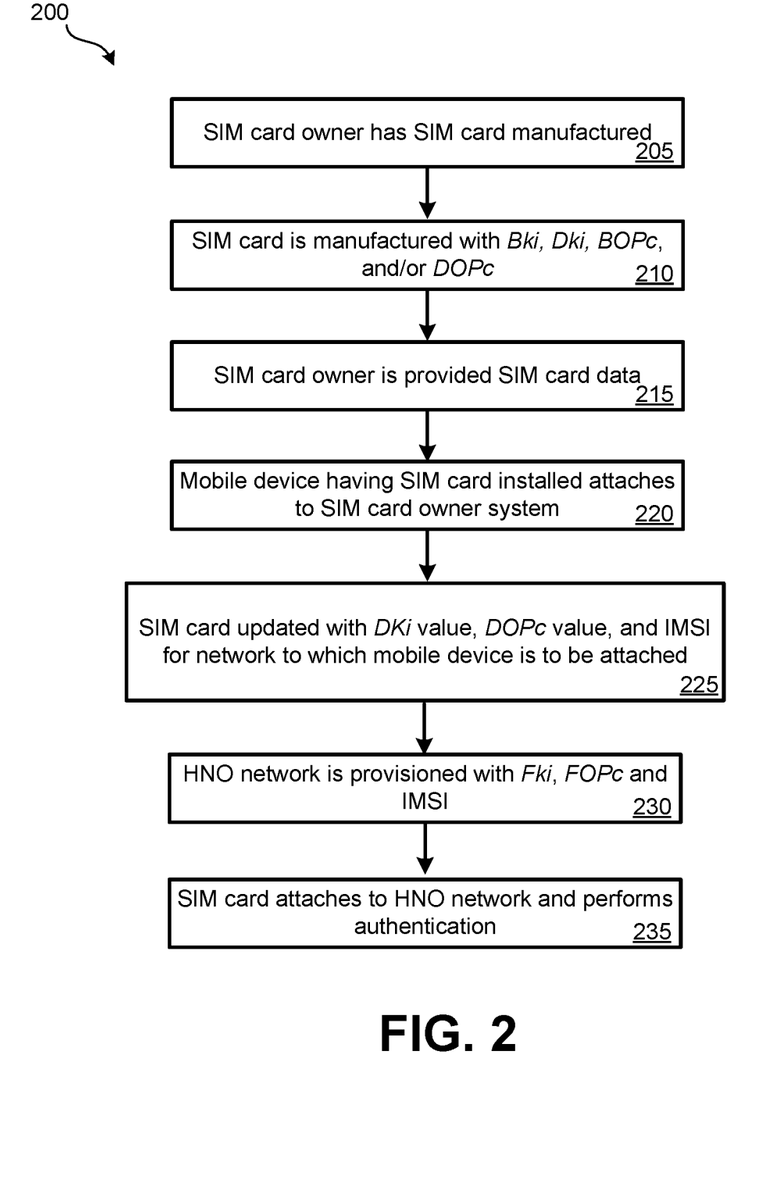
FIG. 2 illustrates an embodiment of a method for using a delta Ki (DKi) value.

FIG. 2 illustrates an embodiment of a method 200 for using a delta Ki (DKi) value. Method 200 may be performed using systems 100A and 100B of FIGS. 1A and 1B. Method 200 may be used for a bootstrap activation of a SIM card on a hosting wireless network (referred to as a hosting network operator's wireless network, or HNO network, for short). A bootstrap activation refers to an activation where the SIM card must first communicate with the SIM card owner system before attaching to an HNO network.

At block 205, a SIM card may be manufactured by a SIM card manufacturer on behalf of a SIM card owner. The SIM card owner may be an entity that will distribute the SIM card to an end-user that will install the SIM card within a wireless device or the SIM card owner may sell or otherwise distribute a wireless device that has the SIM card installed. At block 210, the SIM card may be manufactured. As manufactured, the SIM card may have an immutable BKi value that cannot be overwritten or read from the SIM card. This BKi value may be used in calculating an answer to a challenge question posed to the SIM card. The answer may be output by the SIM card. However, the BKi value may never be output from the SIM card. Further, at block 210, the SIM card may also be manufactured with a writable data field for a DKi value. The DKi value may initially be set to zero or null. This DKi value may be modified by the SIM card based on a received instruction, such as from a SIM card owner system. The SIM card may or may not be able to output the DKi value. The SIM card may also be manufactured with a writable data field for a FKi value. The FKi value may be a summation of the BKi value and the DKi value. Therefore, if the DKi value is initially zero, the FKi value may match the BKi value. In some embodiments, the FKi value may be computed from the DKi value and the BKi value using a mathematical computation other than addition.

In some embodiments, as part of block 205, an immutable BOPc value that cannot be overwritten or read from the SIM card may be added to the SIM card. This BOPc value may be used in calculating a question for a challenge question to be posed by the SIM card to a wireless network for authentication of the wireless network. The question may be output by the SIM card. However, the BOPc value may never be output from the SIM card. Further, at block 210, the SIM card may also be manufactured with a writable data field for a DOPc value. The DOPc value may initially be set to zero or null. This DOPc value may be modified by the SIM card based on a received instruction, such as from a SIM card owner system. The SIM card may or may not be able to output the DOPc value. The SIM card may also be manufactured with a writable data field for a FOPc value. The FOPc value may be a summation of the BOPc value and the DOPc value. Therefore, if the DOPc value is initially zero, the FOPc value may match the BOPc value. In some embodiments, the FOPc value may be computed from the DOPc value and the BOPc value using a mathematical computation other than addition.

At block 215, the SIM card owner may be provided with SIM card data. The SIM card data provided to the SIM card owner may include: the BKi; the BOPc; and the IMSI. In some embodiments, the mathematical computation used to compute the FKi from the BKi (and the FOPc from the BOPc) may also be provided. The DKi and/or the DOPc may not be provided because it is known to be null or zero, or the SIM card owner will overwrite the initial DKi value on the SIM card. The SIM card owner may store the BKi value and the associated IMSI to a SIM card database maintained by the SIM card owner. In some embodiments, this data may be encrypted for security purposes.

At block 220, a mobile device in which the SIM card has been installed may attach to a wireless network. This wireless network is the wireless network of the SIM card owner. Initial data from this attachment may be routed to the SIM card owner system. This routing may be performed based on a range of IMSIs in which the IMSI received from the SIM card of the mobile device falls. In other embodiments, some other identifier is used to determine that the SIM card is associated with the SIM card owner.

A DKi value may be calculated by the SIM card owner system by subtracting the BKi value from a random number. In other embodiments, the DKi value may be calculated using some other mathematical operation. For example, the DKi value may be a randomly selected number. At block 225, the DKi value may be transmitted by the SIM card owner system to the SIM card via the wireless network through which the SIM card attached to the SIM card owner system. In some embodiments, this DKi value may be transmitted in an encrypted form.

In some embodiments, a DOPc value may be calculated by the SIM card by subtracting the BOPc value from a random number. In other embodiments, the DOPc value may be calculated using some other mathematical operation. For example, the DOPc value may be a randomly selected number. At block 225, the DOPc value may be transmitted by the wireless device to the SIM card owner system via the wireless network through which the SIM card attached to the SIM card owner system. In some embodiments, this DOPc value may be transmitted in an encrypted form.

Further, at block 225, the SIM card owner system may calculate the FKi value by summing the BKi value for the SIM card (which may be retrieved from a SIM card database based on the received IMSI) with the calculated DKi value. In other embodiments, the FKi value may be calculated using some other mathematical operation, such as a mathematical operation specified by the SIM card manufacturer at block 215. Similarly, the SIM card owner system may calculate FOPc by summing the BOPc value and the DOPc value.

Additionally, the SIM card may calculate the same FKi value as was calculated by the SIM card owner by summing the BKi value for the SIM card and the received DKi value. In other embodiments, some other mathematical operation defined at the manufacture of the SIM card may be used to calculate the FKi value from the DKi value and BKi value. The same mathematical function is used by the SIM card as was used by the SIM card owner system for calculating the FKi. Similarly, the SIM card may calculate FOPc by summing the BOPc value and the DOPc value.

The FKi value may never be directly stored by the SIM card, such as for security reasons. Rather, only the DKi value may be stored and the BKi value, which cannot be read from the SIM card. By the FKi value not being stored, the ability to clone the SIM card by using the FKi for another device may be prevented. Therefore, the FKi value may only be calculated when it is needed by the SIM card and not stored by the SIM card.

At block 230, the SIM card owner system may transmit the IMSI and the FKi to the HNO on which the mobile device and SIM card are to be activated. This action may be performed in response to the mobile device in which the SIM card is installed attempting to connect to the HNO. The HNO may then request and receive the IMSI, associated FKi, and associated FOPc from the SIM card owner system. Therefore, the hosting network receives the FKi and IMSI, but does not receive the BKi. Therefore, security of the BKi is maintained because it is only stored by the SIM card owner system and the SIM card itself.

At block 235, the SIM card attaches to the HNO network. The HNO network may transmit a challenge based on the FKi to the SIM card. The SIM card uses the FKi to calculate an answer to the challenge and transmits the answer to the HNO network. If the answer calculated by the SIM card is determined to match the answer generated by the HNO using the FKi, the SIM card is authenticated. Additionally or alternatively, the SIM card may transmit a challenge to the HNO network. The HNO network may respond with an answer to the challenge based on the FOPc. If the answer calculated by the HNO network is determined by the SIM card to match the answer calculated locally, the HNO network is authenticated. The mobile device and SIM card may then be provided access to one or more authorized services of the HNO network, such as voice, video, SMS, and/or data access.

Figure 3:
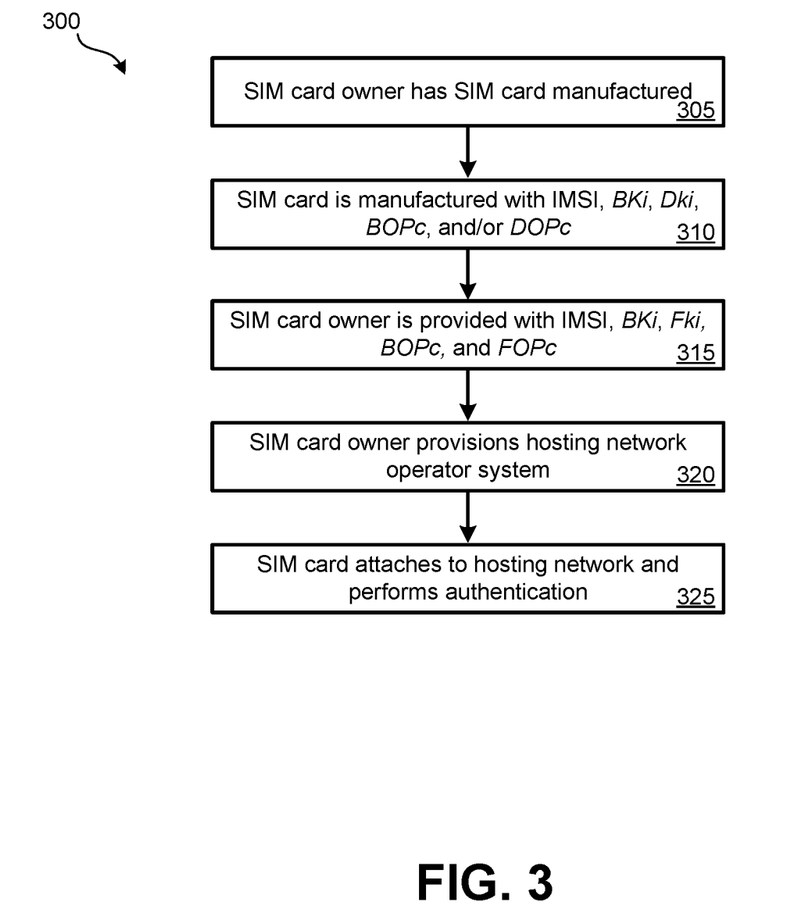
FIG. 3 illustrates another embodiment of a method for using a DKi value.

FIG. 3 illustrates another embodiment of a method 300 for using a DKi value. Method 300 may be performed using systems 100A and 100B of FIGS. 1A and 1B. Method 300 may be used to allow for provisioning directly between a SIM card and an HNO network, without the SIM card initially communication with the SIM card owner system.

At block 305, a SIM card may be manufactured by a SIM card manufacturer on behalf of a SIM card owner. The SIM card owner may be an entity that will distribute the SIM card to an end-user that will install the SIM card within a wireless device or the SIM card owner may sell or otherwise distribute a wireless device that has the SIM card installed. At block 310, the SIM card may be manufactured to have a BKi value that cannot be overwritten or read from the SIM card. Further, at block 310, the SIM card may also be manufactured with an editable data field for a DKi value. The DKi value may initially have a value inserted created by the SIM card manufactured. This DKi value may be a random value of may be created based on the BKi (e.g., subtracting BKi from a random value). The SIM card may or may not be able to output the DKi value.

In some embodiments, the SIM card may be manufactured with an editable data field for an FKi value. The FKi value may be a summation of the BKi value and the DKi value. The initial value of FKi may be written to the SIM card or may be calculated by the SIM card. In other embodiments, the SIM card may never store the FKi value, but rather may calculate the FKi value when needed for security reasons. Rather, only the DKi value may be stored and the BKi value, which cannot be read from the SIM card. By the FKi value not being stored, the ability to clone the SIM card by using the FKi for another device may be prevented. Therefore, the FKi value may only be calculated when it is needed by the SIM card and not stored by the SIM card. Regardless of whether the FKi is written to the SIM card by the SIM card manufacturer or is calculated by the SIM card, the FKi value may be computed from the DKi value and the BKi value using a mathematical computation other than addition. An initial IMSI may also be written to the SIM card by the SIM card manufacturer.

In some embodiments, additionally at block 310, the SIM card may be manufactured to have a BOPc value that cannot be overwritten or read from the SIM card. Further, at block 310, the SIM card may also be manufactured with an editable data field for a DOPc value. The DOPc value may initially have a value inserted created by the SIM card manufactured. This DOPc value may be a random value of may be created based on the BOPc (e.g., subtracting BOPc from a random value). The SIM card may or may not be able to output the DOPc value. The SIM card may also be manufactured with an editable data field for an FOPc value. The FOPc value may be a summation of the BOPc value and the DOPc value.

In some embodiments, the initial value of FOPc may be written to the SIM card or may be calculated by the SIM card. In other embodiments, the SIM card may never store the FOPc value, but rather may calculate the FOPc value when needed for security reasons. Rather, only the DOPc value may be stored and the BOPc value, which cannot be read from the SIM card. By the FOPc value not being stored, the ability to clone the SIM card by using the FKi for another device may be prevented. Therefore, the FOPc value may only be calculated when it is needed by the SIM card and not stored by the SIM card. Regardless of whether the FOPc is written to the SIM card by the SIM card manufacturer or is calculated by the SIM card when needed, the FOPc value may be computed from the DOPc value and the BOPc value using a mathematical computation other than addition.

At block 315, the SIM card owner may be provided with the IMSI, the BKi, and the BOPc (if it does not already have it). The SIM card owner may store the IMSI, the BKi, and the BOPc to a SIM card database. In some embodiments, this data may be stored in an encrypted format. The SIM card manufacturer may also provide the SIM card owner with an FKi and/or FOPc, possibly in an encrypted format. The DKi and the DOPc may not be provided to the SIM card owner. However, if needed, it may be possible for the SIM card owner to calculate the DKi based on the received FKi and the received BKi and the DOPc based on the FOPc and the BOPc. In other embodiments, the DKi and/or DOPc may be provided to the SIM card owner by the SIM card manufacturer.

At block 320, the SIM card owner system may provision the hosting network to which the SIM card and mobile device in which it is installed are to attach with the FKi, FOPc, and/or IMSI. The FKi and/or FOPc may be provided to the HNO in an encrypted format. The HNO may store the FKi, FOPc, and the IMSI to a SIM card database.

At block 325, the SIM card and mobile device in which the SIM card is installed may attach to the HNO. The HNO can transmit a challenge to the SIM card for authentication. If the FKi is not stored, at this block the value may be calculated by the SIM card. The SIM card then uses the FKi to calculate an answer to the challenge. If the answer calculated by the SIM card matches the answer generated by the HNO using the FKi, the SIM card is authenticated. Additionally or alternatively, the SIM card can transmit a challenge to the HNO for authentication. The HNO can use the FOPc to calculate an answer to the challenge. If the answer calculated by the HNO matches the answer generated by the SIM card using the FOPc, the HNO is authenticated. The mobile device and SIM card can then be provided access to one or more authorized services, such as voice, video, SMS, and/or data access.

After block 325 has been performed, if the SIM card is to be used to connect to a different wireless network, the SIM card owner system may calculate a new DKi. The SIM card owner system may use this new DKi to calculate a new FKi. This FKi may be provided, along with the IMSI, to the wireless network to which the SIM card is to be attached. The DKi of the SIM card may be updated as part of the transition process between the HNO and the new wireless network to which the SIM card is being attached.

Figure 4:
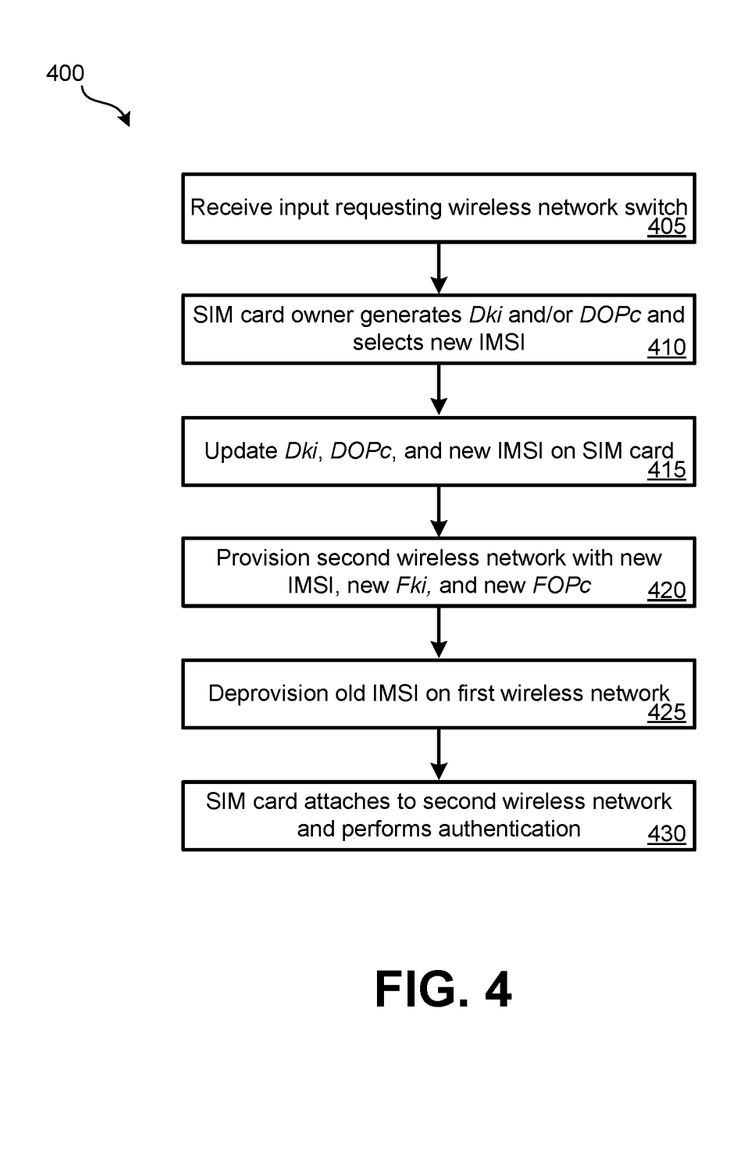
FIG. 4 illustrates an embodiment of a method for switching networks using a DKi value.

FIG. 4 illustrates an embodiment of a method for switching networks using DKi values for security (such that a Ki or BKi value does not need to be shared) and/or DOPc values (such that an OPc or BOPc value does not need to be shared). Method 400 may be performed using systems 100A and 100B of FIGS. 1A and 1B. Method 400 illustrates the steps that may be performed when a SIM card is to be de-provisioned from a first wireless network with which it is attached and is to be attached with a second wireless network. For example, such a scenario may occur when a user travels to a foreign country and desires to connect to a local wireless network that is operated by different network provider than the wireless network with which the SIM card connects in the user's home country. In another example, such a scenario may occur when a user desires to switch wireless network providers.

At block 405, input may be received by the SIM card owner system indicating that a user of a wireless device in which the SIM card is installed desires to switch from a first wireless network to a second wireless network. This input may be received via a webpage, a phone call, input provided to the wireless device in which the SIM card is installed, or in some other form. At block 410, the SIM card owner system may generate a new DKi and/or a new DOPc. This DKi value may be generated by subtracting the BKi value from a random number or according to some other mathematical computation. A similar operation may be performed to compute the DOPc. Further, at block 410, a new IMSI that is appropriate for use in the second wireless network may be selected by the SIM card owner system. The new IMSI may be selected from a pool of IMSIs that are allocated for use in the second wireless network. A new IMSI may be necessary since at least some of the digits of an IMSI may correspond to a particular wireless network provider. It should be understood, however, that a mobile station international subscriber directory number (MSISDN) may remain unchanged. At block 415, the SIM card owner system may update the SIM card with the new DKi value, the new DOPc value and the new IMSI. By virtue of the DKi value being transmitted, the BKi is never exposed; similarly, by the DOPc value being transmitted, the BOPc value is never exposed. Block 415 may be performed while the SIM card is still attached with the first wireless network. In response to receiving the new DKi and/or DOPc, the SIM card may use the new DKi with its stored BKi to compute a new FKi and may use the new DOPc with its stored BOPc value to compute a new FOPc value.

At block 420, the SIM card owner system may provision the second wireless network with the new IMSI, the new FKi, and the new FOPc. It should be understood that block 420 may be performed earlier in this process. For example, block 420 may be performed prior to the SIM card being updated with the new IMSI, new DKi value, and new DOPc. At block 425, the old IMSI may be de-provisioned from the first wireless network. By the old IMSI being de-provisioned, the SIM card may no longer be authorized to access the first wireless network.

At block 430, the SIM card may be used by mobile device to attach to the second wireless network. The second wireless network, now functioning as the HNO network, can transmit a challenge based on the new FKi to the SIM card for authentication. The SIM card then uses the new FKi, which is stored locally, to calculate an answer to the challenge. In some embodiments, additionally, the SIM card, via the wireless device, may transmit a challenge to the second wireless network functioning as the HNO network based on the FOPc. The HNO network then uses its stored version of the FOPc to calculate an answer to the challenge. The answer is provided to the SIM card via the second wireless network. If the answers calculated for each challenge are correct, the SIM card is authenticated and the mobile device and SIM card are provided access to one or more authorized services, such as voice, video, SMS, and/or data access on the second wireless network that is functioning as the HNO network.

Figure 5:
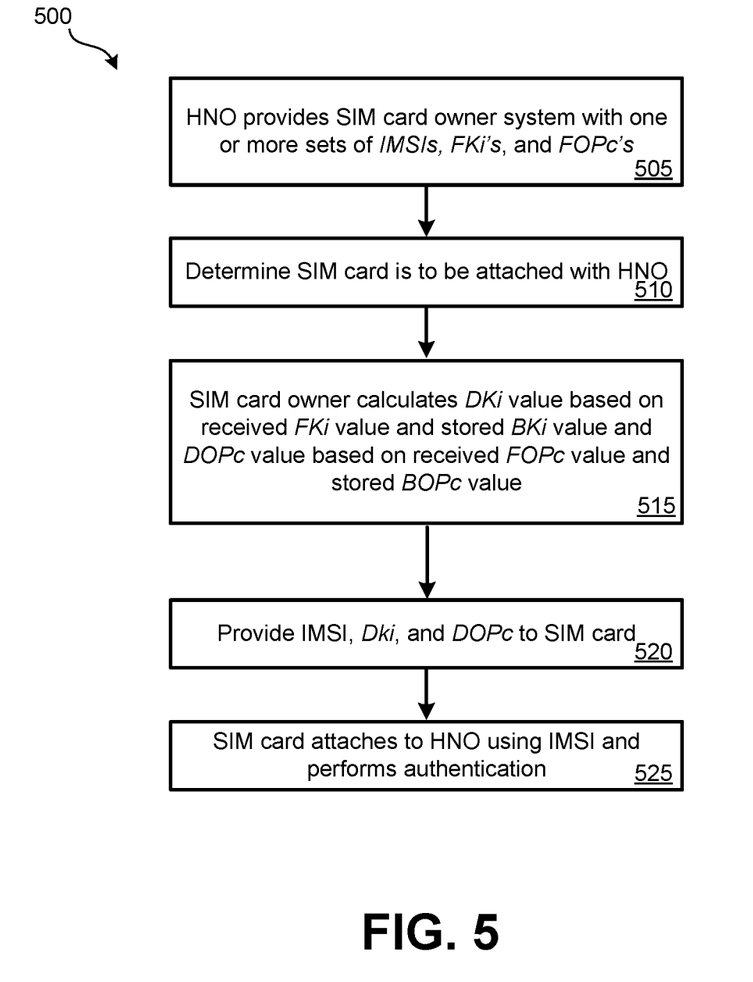
FIG. 5 illustrates an embodiment of a method for reusing identities.

FIG. 5 illustrates an embodiment of a method 500 for reusing identities (pairs of IMSIs and FKis) across multiple SIM cards. Method 500 may be performed using systems 100A and 100B of FIGS. 1A and 1B. In method 500, one or more IMSIs, associated FKi's, and FOPc's remain provisioned at a HNO for a SIM card owner. The SIM card owner is authorized to assign these identities to SIM cards, such that an identity is assigned to a single SIM card at a given time. Such an arrangement may allow for a set of identities to remain provisioned by an HNO network and for a SIM card owner to assign these identities among different SIM cards as desired.

At block 505, an HNO provides a SIM card owner system with one or more pairs of IMSIs, FKi's, and, possibly, FOPc's. Each set of an IMSI, FKi, and possibly, FOPc may be referred to as an identity. The SIM card owner system may store in a database each IMSI and its paired FKi. The FOPc may also be stored with this data or may be stored separately since the FOPc may be used for many SIM cards. At block 510, a determination may be made by the SIM card owner system that a particular SIM card is to be attached with the HNO.

In response to block 510, the SIM card owner system may calculate a DKi value for the SIM card based on an FKi value of an available identity stored by the SIM card owner system. For example, if the SIM card calculates an FKi by adding its BKi to a received DKi, the SIM card owner system can calculate DKi by subtracting the stored BKi of the SIM card from the FKi value of the identity to be linked with the SIM card. A similar calculation may be performed to obtain a DOPc value.

At block 520, the IMSI from the identity to be stored by the SIM card, the calculated DKi, and the calculated DOPc may be provided to the SIM card by the SIM card owner system, such as via a wireless network with which the SIM card is currently attached. At block 525, the SIM card may attached to the HNO using the received IMSI and the FKi and, possibly, FOPc calculated locally by the SIM card. The FKi calculated locally by the SIM card would be expected to match the FKi provided at block 405 as part of one of the identities from the HNO to the SIM card owner system. Similarly, the FOPc calculated locally the SIM card would be expected to match the FOPc provided at block 405 as part of one of the identities from the HNO to the SIM card owner system. The HNO network can then transmit a challenge to the SIM card for authentication. The SIM card then uses the calculated FKi to calculate an answer to the challenge. Similarly, the SIM card can transmit a challenge to the HNO network for authentication. The HNO network can use the FOPc to calculate an answer to the challenge and transmit the answer to the SIM card. If the answers calculated are correct, the SIM card and the HNO are authenticated and the mobile device and SIM card are provided access to one or more authorized services from the HNO network, such as voice, video, SMS, and/or data access.

At some future point, the SIM card may cease being used or may be updated to function using a different identity and/or network. After such a time, the SIM card operator may reassign the identity that includes the IMSI, FKi, and FOPc provided at block 405 to a second SIM card. The second SIM card would receive the same IMSI as provided at block 420, but would be provided with a different DKi and a different DOPc. This different DKi would be calculated similar to block 415 such that the second SIM card would calculate the FKi value based on its immutable BKi and the received DKi, thus resulting in the FKi and IMSI being reused by the second SIM card. A similar procedure would be performed for the DOPc value.

While in the previously described embodiments, both the concept of authentication using BKi's and BOPc's is discussed, it should be understood that in other embodiments, an authentication procedure using only BKi's or only BOPc's can be possible. For instance, the arrangement detailed herein may be used for only authenticating the SIM card and not for authenticating the wireless network. Alternatively, the arrangements detailed herein may be used for only authenticating the wireless network and not for authenticating the SIM card.

Throughout this document, reference has been made to various values, referred to as a BKi, DKi, and FKi. It should be understood that these names have been provided to reference the Ki value conventionally used on SIM cards. The terms used to represent these values may be altered, such as by referring to them as: a base value, a difference value, and a full value. Similarly, it should be understood that the values referred to as a BOPc, DOPc, and FOPc are intended to reference the conventionally used OPc value. The terms used to represent these values may be altered, such as by referring to them as: a base value, a difference value, and a full value.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for using a subscriber identification module (SIM) card across multiple wireless networks, the method comprising:
    calculating, by a SIM card owner system, a DKi (delta Ki) value, wherein the DKi value is editable and calculated by subtracting a Bki value from a random number;
    providing, by the SIM card owner system, via a wireless network, the DKi value to the SIM card;
    storing, by the SIM card, the DKi value, wherein the SIM card has an immutable BKi (base Ki) value that is permanently stored;
    calculating, by the SIM card, a FKi (full Ki) value using the DKi value and the BKi value;
    attaching, by the SIM card, to a guest wireless network, wherein the SIM card is installed within a wireless device;
    receiving, by the SIM card, from the guest wireless network, a challenge;
    calculating, by the SIM card, an answer to the challenge using the FKi value; and
    transmitting the answer to the wireless network, wherein in response to the answer being correct, the wireless device having the SIM card installed is successfully authenticated to use the wireless network.

2. The method for using the SIM card across multiple wireless networks of claim 1, further comprising:
    calculating, by the SIM card owner system, an FKi value based on the DKi value and the BKi value.

3. The method for using the SIM card across multiple wireless networks of claim 2, further comprising:
    providing, by the SIM card owner system, the FKi value to the guest wireless network.

4. The method for using the SIM card across multiple wireless networks of claim 3, wherein the challenge received from the guest wireless network is based on the FKi value provided by the SIM card owner system.

5. The method for using the SIM card across multiple wireless networks of claim 1, further comprising:
    manufacturing the SIM card such that the immutable BKi value is permanently stored and the DKi value is editable.

6. The method for using the SIM card across multiple wireless networks of claim 1, further comprising:
    storing, by the SIM card, a DOPc (delta operator code) value, wherein the SIM card has an immutable BOPc (base operator code) value;

calculating, by the SIM card, a FOPc (full operator code) value using the DOPc value and BOPc value;

causing, by the SIM card, a network challenge to be transmitted to the guest wireless network;

calculating, by the SIM card, a network answer to the network challenge using the FOPc value;

receiving, by the SIM card, the network answer to the network challenge from the guest wireless network;

determining, by the SIM card, the calculated network answer to the challenge and the received network answer to the network challenge match; and in response to the match, authenticating the guest wireless network.

7. The method for using the SIM card across multiple wireless networks of claim 6, further comprising:

calculating, by the SIM card owner system, the FOPc value based on the DOPc value and the BOPc value.

8. The method for using the SIM card across multiple wireless networks of claim 7, further comprising:

providing, by the SIM card owner system, the FOPc value to the guest wireless network, wherein the guest wireless network uses the FOPc value to determine the answer to the challenge received from the SIM card.

9. A system that uses a subscriber identification module (SIM) card, the system comprising:

a SIM card, configured to:
store an international mobile subscriber identity (IMSI);
store a BKi (base Ki) value that is immutable, the BKi value being permanently stored by the SIM card;
store a DKi (delta Ki) value that is editable, wherein:
the DKi value is calculated by subtracting the Bki value from a random number; and
the DKi value is provided by a SIM card owner system to the SIM card via a wireless network;
calculate a FKi (full Ki) value using the DKi value and the BKi value;
calculate a response to a challenge using the calculated FKI; and
output the response to the challenge and an IMSI for transmission to the wireless network.

10. The system that uses the SIM card of claim 9, further comprising:

a home wireless network comprising the SIM card owner system; and a SIM card database that maps a plurality of IMSIs with a plurality of BKi values, wherein the IMSI is mapped to the BKi value.

11. The system that uses the SIM card of claim 10, wherein the SIM card owner system is further configured to:
compute the DKi value mapped to the IMSI and BKi value; and
compute the FKi value using the DKi value and the BKi value.

12. The system that uses the SIM card of claim 11, wherein the SIM card owner system is further configured to transmit the DKi value to the SIM card via the home wireless network.

13. The system that uses the SIM card of claim 12, wherein the SIM card owner system is further configured to transmit the FKi value to a guest wireless network.

14. The system that uses the SIM card of claim 13, wherein the guest wireless network creates the challenge based on the FKi value.

15. The system that uses the SIM card of claim 10, wherein the SIM card is further configured to:
store a BOPc (base operator code) value that is immutable;
store a DOPc (delta operator code) value that is editable;
calculate a FOPc (full operator code) value using the DOPc value and the BOPc value;
calculate a network challenge using the FOPc;
calculate a calculated network answer to the challenge using the FOPc;
receive a network answer to the network challenge from a guest wireless network; and
authenticate the wireless network based on the received network answer matching the calculated network answer.

16. The system that uses the SIM card of claim 15, wherein the SIM card owner system is further configured to store the DOPc value as mapped to the IMSI.

17. The system that uses the SIM card of claim 16, wherein the SIM card owner system is further configured to:
provide the FOPc value to the guest wireless network, wherein the guest wireless network uses the FOPc value to determine the answer to the challenge received from the SIM card.

* * * * *